Patented Jan. 30, 1940

2,188,323

UNITED STATES PATENT OFFICE 2,188,323

METHOD OF PREPARING CO-CARBOXYLASE

Henry Tauber, Florence, S. C., assignor to Merck & Co. Inc., Rahway, N. J., a corporation of New Jersey No Drawing. Application June 28, 1938,
Serial No. 216,387

7 Claims. (Cl. 260—251)

This invention relates to a method of preparing a co-carboxylase concentrate, and more particularly to an easy and efficient method of synthetically preparing such concentrate.

Co-coboxylase concentrates may be obtained from natural sources, for example, from yeast, but such methods of preparation are extremely tedious and costly.

I have discovered that co-carboxylase concentrates can be synthetically prepared with good yield and at relatively low cost by reacting vitamin $B_1$ salts, such as the hydrochloride, hydrobromide, phosphate, sulfate, etc., with a pyrophosphate, such as sodium pyrophosphate, and a mineral acid, such as orthophosphoric acid. The reaction may be carried out at between about 100–200° C., best results being obtained at a temperature of about 155° C.

The following examples illustrate methods of carrying out my invention but it is to be understood that these examples are by way of illustration and not of limitation.

Example I 1 cc. of 85% orthophosphoric acid is heated in a pyrex tube until a slight precipitate forms on the side of the tube and dense fumes appear, and 500 mg. of sodium pyrophosphate, free of water of crystallization, are added thereto. 500 mg. of vitamin $B_1$ hydrochloride are then added and the mixture heated to 155° C. on an oil bath for about 3 to 15 minutes, with stirring. The mass is allowed to cool, and 10 cc. of water are added. A saturated barium hydroxide solution is added until no more precipitate forms. The precipitate is centrifuged off and shaken for five minutes with 40 cc. of water. It is again centrifuged, 30 cc. of water is added to the precipitate, the mixture is boiled for one minute, and again centrifuged. This procedure is repeated two more times. The four extracts are added together and made slightly acid to congo by the addition of dilute sulfuric acid. The mass is allowed to stand in the refrigerator for a few hours and the barium sulphate is centrifuged off. 5 cc. of N hydrochloric acid are added to the solution, and the mixture is concentrated in vacuo to 30 cc. at about 25° C. At this point a small amount of crystals appear. The mixture is cooled in ice water and 10 volumes of a mixture of two parts ether and one part absolute alcohol are added. Crude co-carboxylase immediately precipitates. It is dissolved in 3 cc. of 0.3 N hydrochloric acid and again precipitated as above. By repeating the precipitation two more times, many of the impurities are removed. A physical yield of about 70% of a synthetic non-hygroscopic co-carboxylase concentrate is obtained, which shows activity similar to the co-carboxylase obtained from natural sources.

Example II

The procedure of Example I is carried out, substituting extraction with water at ordinary temperature for extraction with water at the boiling point. The physical yield of co-carboxylase concentrate is about 96%.

Modifications may be made in carrying out this process without departing from the spirit and scope of this invention, and I am to be limited only by the appending claims.

I claim:

1. The process comprising reacting an alkali-metal pyrophosphate, phosphoric acid, and a vitamin $B_1$ salt at a temperature of between about 100 and 200° C.

2. The process comprising reacting an alkali-metal pyrophosphate, phosphoric acid, and a vitamin $B_1$ salt at a temperature of about 155° C.

3. The process comprising reacting sodium pyrophosphate, orthophosphoric acid, and a vitamin $B_1$ salt at a temperature of about 155° C.

4. The process comprising reacting sodium pyrophosphate, orthophosphoric acid and a vitamin $B_1$ hydrohalide at a temperature of about 155° C.

5. The process comprising reacting sodium hyrophosphate, orthophosphoric acid and vitamin $B_1$ hydrochloride at a temperature of about 155° C.

6. The process comprising reacting sodium pyrophosphate, orthophosphoric acid and vitamin $B_1$ hydrobromide at a temperature of about 155° C.

7. The process comprising reacting sodium pyrophosphate, orthophosphoric acid and vitamin $B_1$ hydrochloride at a temperature of about 155° C., dissolving the reaction mass in water, adding barium hydroxide solution to the aqueous solution, removing the barium precipitate formed, repeatedly washing the said precipitate with water, making the combined extracts slightly acid with dilute sulfuric acid, removing the barium sulfate formed, treating the solution with a mixture of absolute alcohol and ether to obtain a co-carboxylase concentrate.

HENRY TAUBER.